United States Patent [19]

Bergna et al.

[11] Patent Number: 4,683,334

[45] Date of Patent: Jul. 28, 1987

[54] MODIFIED 8-RING ZEOLITES AS CATALYSTS FOR CONVERSION OF METHANOL AND AMMONIA TO DIMETHYLAMINE

[75] Inventors: Horacio E. Bergna, Wilmington, Del.; David R. Corbin, West Chester, Pa.; George Sonnichsen, Wilmington, Del.

[73] Assignee: E. I. Du Pont de Nemours & Company, Wilmington, Del.

[21] Appl. No.: 729,161

[22] Filed: Apr. 30, 1985

[51] Int. Cl.$^4$ .................. C07C 85/02; C07C 85/06
[52] U.S. Cl. .................... 564/474; 564/479
[58] Field of Search ................. 564/474, 479

[56] References Cited

U.S. PATENT DOCUMENTS

| | | | |
|---|---|---|---|
| Re. 19,632 | 7/1935 | Arnold | 260/127 |
| 1,926,691 | 9/1933 | Swallen | 260/127 |
| 1,992,935 | 3/1935 | Arnold | 260/127 |
| 2,349,222 | 5/1944 | Goshorn | 260/585 |
| 2,349,515 | 2/1946 | Goshorn | 260/583 |
| 2,394,516 | 2/1946 | Goshorn | 260/583 |
| 2,456,599 | 12/1948 | Smith | 260/585 |
| 3,278,598 | 10/1966 | Markiewitz | 260/563 |
| 3,384,667 | 5/1968 | Hamilton | 260/585 |
| 3,387,032 | 6/1968 | Leonard | 260/585 |
| 3,753,929 | 8/1973 | Lindsley | 252/451 |
| 4,082,805 | 4/1978 | Kaeding | 260/585 |
| 4,191,709 | 3/1980 | Parker et al. | 260/583 |
| 4,203,869 | 5/1980 | Rollman | 252/455 |
| 4,254,061 | 2/1981 | Weigert | 564/479 |
| 4,275,256 | 6/1981 | Chu et al. | 252/455 |
| 4,278,827 | 7/1981 | Chu et al. | 585/467 |
| 4,283,306 | 8/1981 | Herkes | 252/432 |
| 4,313,003 | 1/1982 | Weigert | 564/463 |
| 4,398,041 | 8/1983 | Cochran et al. | 564/479 |
| 4,402,867 | 9/1983 | Rodewald | 252/455 |
| 4,434,300 | 2/1984 | Deeba et al. | 564/479 |
| 4,436,938 | 3/1984 | Tompsett | 564/474 |
| 4,452,909 | 5/1984 | Yang | 502/69 |
| 4,485,261 | 11/1984 | Ashina et al. | 564/479 |
| 4,547,591 | 10/1985 | Brennan et al. | 564/479 |

FOREIGN PATENT DOCUMENTS

| | | |
|---|---|---|
| 0085408 | 1/1983 | European Pat. Off. |
| 56-53887 | 10/1982 | Japan |
| 422563 | 7/1933 | United Kingdom |
| 2079737 | 1/1982 | United Kingdom |

OTHER PUBLICATIONS

Restelli, et al., *A. I. Ch. E. Journal* 12:292 (1966).
Mochida et al., *Journal of Catalysis* 82:313 (1981).

*Primary Examiner*—Charles F. Warren
*Assistant Examiner*—John A. Sopp

[57] ABSTRACT

A process for producing dimethylamine is provided, comprising reacting methanol and/or dimethylether and ammonia, in amounts sufficient to provide a carbon/nitrogen (C/N) ratio from about 0.2 to about 1.5, and at a temperature from about 250° C. to about 450° C., in the presence of a catalytic amount of a modified acidic zeolite selected from the group consisting of chabazite, erionite, ZK-5, and rho, the zeolite having been modified by treatment with one or more compounds containing at least one element selected from the group consisting of silicon, aluminum, phosphorus, and boron, to deposit thereon at least 0.05 weight percent of the element.

26 Claims, No Drawings

MODIFIED 8-RING ZEOLITES AS CATALYSTS FOR CONVERSION OF METHANOL AND AMMONIA TO DIMETHYLAMINE

BACKGROUND OF THE INVENTION

This invention involves a process for making amines, particularly dimethylamine, in which methanol and/or dimethylether and ammonia are contacted in the presence of a selected zeolite catalyst.

Methylamines are generally prepared in industrial quantities by continuous reaction of methanol and ammonia in the presence of a silica-alumina catalyst. The reactants are typically combined in the vapor phase, at temperatures in the range of 300° to 500° C., and at elevated pressures. Trimethylamine (TMA) is the principal component of the resulting product stream, accompanied by lesser amounts of monomethylamine (MMA) and dimethylamine (DMA). From a commercial standpoint, the most valued product of the reaction is dimethylamine, in view of its widespread industrial use as a chemical intermediate. Accordingly, a major objective of those seeking to enhance the commercial efficiency of this process has been to improve overall yields of dimethylamine, and to a lesser extent, monomethylamine, relative to trimethylamine. Among the approaches taken to meet this objective are recycling of trimethylamine, adjustment of the ratio of methanol to ammonia reactants, and use of selected dehydrating or aminating catalyst species. Due to the commercial importance of the process, an extensive compendium of patents and other contributions to the technical literature has resulted. Representative references generally relevant to the field of the present invention are summarized in the following paragraphs.

Swallen, U.S. Pat. No. 1,926,691, discloses a process for producing dimethylamine by disproportionating monomethylamine over dehydrating or aminating catalysts such as alumina, silica, thoria, aluminum silicate or partially dehydrated aluminum trihydrate.

Arnold, U.S. Pat. No. 1,992,935, describes a process for catalytic synthesis of amines from alcohols and ammonia which employs as catalyst a dehydrating oxide, e.g., alumina, deposited on the surface of a porous, rigid gel, e.g., silica gel. Arnold, U.S. Pat. No. Re. 19,632, discloses a process improvement in which trimethylamine is introduced with the methanol and ammonia reactants to shift reaction equilibrium in favor of dimethylamine production.

Johnson, British Pat. No. 422,563, discloses a process for producing aliphatic amines involving heating an alcohol or ether under a pressure of more than about 50 atmospheres in the presence of a "catalyst capable of splitting off water" (e.g., alumina), with an excess of ammonia and optionally with addition of primary amine to the reaction mixture.

Goshorn, U.S. Pat. No. 2,349,222, discloses use of granular alumina coated with one or more oxides of nickel, cobalt, or chromium as a catalyst for alkylation of ammonia to produce alkyl amines. Goshorn, U.S. Pat. Nos. 2,394,515 and 2,394,516, discloses use as catalyst of an aluminum salt or oxide coated with silica and vanadium or molybdenum oxide.

Smith, U.S. Pat. No. 2,456,599, discloses a process improvement wherein water is added to a reactant feed mixture of methanol and ammonia to repress formation of tertiary amine in favor of primary and secondary amine.

Markiewitz, U.S. Pat. No. 3,278,598, discloses use of a rhodium, palladium, or ruthenium cocatalyst in conjunction with Raney metals to increase production of secondary amines from the reaction of alcohols and ammonia.

Rostelli et al., *A. I. Ch. E. Journal* 12:292 (1966) describe studies of transmethylation reactions of monomethylamine and dimethylamine over montmorillonite, a hydrated magnesium or calcium oxide-containing aluminosilicate having a porous lattice structure. For transmethylation of monomethylamine, this work indicated that reaction rate was directly proportional to reactant partial pressure, indicating that the rate-determining event is adsorption of reactant to the catalyst surface.

Hamilton, U.S. Pat. No. 3,384,667, describes alkylation of ammonia in the presence of a dehydrated crystalline aluminosilicate catalyst having pores of a diameter permitting absorption of primary and secondary, but not tertiary, amine products.

Leonard, U.S. Pat. No. 3,387,032, discloses a process for reacting ammonia with methanol and/or dimethylether in the presence of a catalyst consisting of a silica gel base impregnated with 10-15% alumina which is first steam-deactivated and then treated with silver, rhenium, molybdenum, or cobalt ions to promote selectivity for dimethylamine.

Kaeding, U.S. Pat. No. 4,082,805, discloses use of a crystalline aluminosilicate or zeolite catalyst having the structure of ZSM-5, ZSM-11 or ZSM-21 in a process for producing amines by reaction of ammonia with $C_1$–$C_5$ alcohols at elevated temperatures and pressures.

Parker et al., U.S. Pat. No. 4,191,709, describe the use of a hydrogen form of zeolite FU-1 or zeolite FU-1 in which some or all of the protons have been replaced by bivalent or trivalent cations.

Weigert, U.S. Pat. No. 4,254,061, discloses a process in which production of monomethylamine is enhanced by reacting methanol and ammonia in amounts sufficient to provide a C/N ratio of 0.5 to 1.5 over a catalyst selected from (a) mordenite wherein the primary cation is Li, Na, HNa having at least 2% Na by weight, K, Ca, Sr, Ba, Ce, Zn or Cr;

(b) ferrierite wherein the primary metal cation is Li, Na, K, Ca, Sr, Ba, Ce or Fe;

(c) erionite ore;

(d) calcium erionite; and (e) clinoptilolite ore, at a temperature of 250°–475° C. and a pressure of 7–7000 kPa, a contact time, normalized to 7 kPa of 0.1 to 60 seconds and a methanol conversion of 15–95%.

Ashina et al., Japanese published Patent Application No. 56-53887, and Mochida et al., *Journal of Catalysis* 82:313 (1981), also disclose use of mordenite zeolites to enhance production of dimethylamine in closely related variants of the process disclosed by Weigert.

Weigert, U.S. Pat. No. 4,313,003, discloses an improved process for disproportionating monomethylamine to dimethylamine and ammonia, comprising passing monomethylamine over a crystalline aluminosilicate catalyst selected from (a) mordenite wherein the primary cation is Na, HNa having at least 2% Na, Mg, Ca, Sr or Ba;

(b) ferrierite wherein the primary metal cation is Na, K, Mg, Ca, Sr or Ba;

(c) clinoptilolite; and
(d) phillipsite,
at a temperature of 250°–475° C. and a pressure of 7–7000 kPa, at a feed rate of 0.1–10 g of monomethylamine/g of catalyst per hour, and at a monomethylamine conversion of 15–75%.

Cochran et al., U.S. Pat. No. 4,398,041, describe a process for converting $C_1$–$C_4$ alcohols to a non-equilibrium controlled distribution of primary, secondary, and tertiary alkylamines. The process disclosed involves passing a mixture of reactant alcohols and ammonia into a first conversion zone containing a "shape-selective" crystalline aluminosilicate catalyst having a pore size selective for mono- and disubstituted alkylamine products; dividing the resulting product stream; passing one portion of this product stream to a second conversion zone containing another catalyst having a different pore size distribution; and combining the remaining portion of the first product stream with the product stream of the second conversion zone to yield a non-equilibrium controlled product distribution. The zeolite catalysts disclosed by this reference include 5A zeolite, REY zeolite, H-chabazite-erionite, H-erionite, H-mordenite, and H-Y zeolite. Deeba et al., published European Patent Application No. 0085408, disclose a method for improving methanol conversion rates comprising reacting methanol and ammonia over a highly acidic dehydrated aluminosilicate catalyst having a silica to aluminum ratio of at least 2.0 and manifesting microporous diffusivity for methylamines.

Deeba et al., U.S. Pat. No. 4,434,300 disclose a method for improving methanol conversion rates in the reaction of methanol and ammonia to produce methylamines which comprises conducting the reaction in the presence of a macroporous, highly acidic aluminosilicate.

Tompsett, U.S. Pat. No. 4,436,938, discloses a process for making methylamines comprising reacting methanol and/or dimethylether over a binderless zeolite A catalyst, preferably a binderless zeolite 5A catalyst.

Currently, methylamines are produced using an adiabatic plug flow reactor. Although specific conditions do vary depending upon ammonia feed ratio and amount of product recycle, reactor inlet temperatures are generally run from about 310° C. to about 340° C., and outlet temperatures are preferably about 400° C. to about 430° C. The difference between inlet and outlet temperatures is due to exothermicity of the reaction and is moderated by recycling of ammonia and trimethylamine. The foregoing temperatures represent a compromise between increasing production rates at a given reactor size, which is favored at higher reaction temperatures, and reducing catalyst deactivation, which is minimized at lower reaction temperatures. More active catalysts permit operation at lower reaction temperatures, increasing catalyst life and/or decreasing the need to recycle ammonia or trimethylamine.

A number of references disclose methods of making and using zeolites which have been coated with silica, alumina, or like materials. For example, Lindsley, U.S. Pat. No. 3,753,929, describes a method for preparing an alumina-coated zeolite by contacting a zeolite with a soluble aluminum sulfate, or aluminate, at pH 3–5. Nozemack, U.S. Pat. No. 2,079,737, discloses a method for making an alumina-coated zeolite by adding an aluminum salt to a slurry of a finely divided zeolite at pH 7 to 8, and then adding a base to adjust the pH to 9 to 11. The resulting catalysts are claimed to be useful as selective cracking catalysts.

Rollman, U.S. Pat. No. 4,203,869, describes methods for making zeolites having an essentially aluminum-free outer shell, involving depositing an isocrystalline layer of aluminum-free zeolite over the surface of ZSM-5 type zeolite. This catalyst type is also employed in refining processes.

Chu et al., U.S. Pat. No. 4,275,256, disclose a process for conversion of aromatic compounds to dialkylbenzene compounds rich in the 1,4-dialkylbenzene isomer. This process employs a modified zeolite catalyst which has been treated to deposit minor amounts of manganese and/or rhenium, and optionally phosphorus, upon the surface of the zeolite. Chu et al., U.S. Pat. No. 4,278,827, disclose an analogous process which employs a zeolite modified by deposits of minor amounts of germanium, tin and/or lead, and optionally phosphorus, upon the zeolite surface.

Herkes, U.S. Pat. No. 4,283,306, discloses novel crystalline silicas used as catalysts for alkylation of aromatics which incorporate such compounds as arsenic oxide, phosphorous oxide, boron oxide, antimony oxide, amorphous silica, alkaline earth metal oxides, carbonates, and precursors and mixtures thereof.

Rodewald, U.S. Pat. No. 4,402,867, discloses a method for making a zeolite having amorphous silica deposited within the zeolite framework. The resulting catalyst is reported to be useful in such processes as conversion of methanol and dimethylether to a hydrocarbon mixture rich in ethylene and propylene.

Yang, U.S. Pat. No. 4,452,909, discloses a process for preparing silica polymorphs having an outer coating of amorphous silica. Coated zeolites are described; however, their use in methylation of ammonia is not disclosed.

As the foregoing discussion suggests, new catalyst types or process improvements which optimize production of dimethylamine while suppressing production of trimethylamine in the reaction of methanol and ammonia are of interest to the chemical industry.

SUMMARY OF THE INVENTION

The present invention provides a process for producing dimethylamine, comprising reacting methanol and/or dimethylether and ammonia, in amounts sufficient to provide a carbon/nitrogen (C/N) ratio of from about 0.2 to about 1.5, and at a temperature from about 250° C. to about 450° C., in the presence of a catalytic amount of a modified acidic zeolite selected from the group consisting of chabazite, erionite, ZK-5, and rho, the zeolite having been modified by treatment with one or more compounds containing at least one element selected from the group consisting of silicon, aluminum, phosphorus, and boron, to deposit thereon at least 0.05 weight percent of the element. In addition, the present invention provides catalyst compositions comprising the modified acidic zeolites.

DETAILED DESCRIPTION OF THE INVENTION

Zeolites can be generically described as complex aluminosilicates characterized by a three-dimensional framework structure enclosing cavities occupied by ions and water molecules, all of which can move with significant freedom within the zeolite matrix. In commercially useful zeolites, water molecules can be removed from or replaced within the framework without destroying its geometry. Zeolites can be represented by the following formula:

$$M_{2/n}O \cdot Al_2O_3 \cdot xSiO_2 \cdot yH_2O$$

wherein M is a cation of valence n, x>2, and y is a number determined by the porosity and the hydration state of the zeolite, generally from 2 to 8. In naturally-occurring zeolites, M is principally represented by Na, Ca, K, Mg and Ba in proportions usually reflecting their approximate geochemical abundance. The cations M are loosely bound to the structure and can frequently be completely or partially replaced with other cations by conventional ion exchange.

Zeolite structure consists of corner-linked tetrahedra with Al or Si atoms at centers of tetrahedra and oxygen atoms at corners. Such tetrahedra are combined in a well-defined repeating structure comprising various combinations of 4-, 6-, 8-, 10-, and 12-membered rings. The resulting framework consists of regular channels and cages, which impart a useful pore structure for catalysis. Pore dimensions are determined by the geometry of the aluminosilicate tetrahedra forming the zeolite channels or cages, with nominal openings of 2.6 Å for 6-rings, 4.0 Å for 8-rings, and 5.5 Å for 10-rings. Pore dimensions are critical to catalytic performance, since this zeolite characteristic determines whether reactant molecules can enter and product molecules can exit the zeolite framework. In practice, it has been observed that slight decreases in ring dimensions can effectively hinder or block movement of particular reactants or products within a zeolite structure.

The pore dimensions which control access to the interior of the zeolite are determined not only by the tetrahedra forming the pore opening, but also by the presence or absence of ions in or near the pore. In the case of zeolite A, for example, access can be restricted by monovalent ions, such as $Na^+$ or $K^+$, which are situated in or near 8-ring openings as well as 6-ring openings. Access is enhanced by divalent ions, such as $Ca^{2+}$, which are situated only in or near 6-rings. Thus KA and NaA exhibit effective pore openings of about 0.3 nm and 0.4 nm respectively, whereas CaA has an effective pore opening of 0.5 nm.

Useful references generally relating to zeolite structure and characterization include the following:
Meier et al., *Atlas of Zeolite Structure Types* (International Zeolite Assn. 1978);
Mumpton, "Natural Zeolites" in *Reviews in Mineralogy* 14:1 (1977);
Smith, "Origin and Structure of Zeolites" in *Zeolite Chemistry and Catalysis*, ACS Monograph 171 (American Chemical Society, 1976).

Characteristics of 8-Ring Zeolites Employed as Catalysts in the Present Invention The zeolite species selected for coating and use as catalysts in the process of the present invention are acidic zeolites selected from the group consisting of chabazite, erionite, ZK-5, and rho. They share a common structural characteristic: pores or channels within the zeolite framework, the largest of which are bounded by 8-membered rings of tetrahedral atoms. This structural characteristic is associated with catalytic selectivity for production of dimethylamine from methanol and ammonia. Modification of these zeolites by treatment with one or more compounds containing at least one element selected from the group consisting of silicon, aluminum, phosphorus, or boron, to deposit a minor proportion of one or more of these elements, increases selectivity of the resulting catalyst for dimethylamine in the reaction of methanol and ammonia.

The zeolites employed in this invention are acidic zeolites selected from the group consisting of the synthetic zeolites rho and ZK-5, natural or ion-exchanged chabazites from particular locations, and acidic erionite.

Acid forms of zeolites can be prepared by a variety of techniques including ammonium exchange followed by calcination, direct exchange of alkali ions for protons using mineral acids or ion exchangers, and introduction of polyvalent ions (for a discussion of acid sites in zeolites, see Dwyer, "Zeolite Structure, Composition and Catalysis". In *Chemistry and Industry*, Apr. 2, 1984). Bronsted sites are generally produced by deammoniation at low temperatures, exchange with protons, or hydrolysis of polyvalent cations. Lewis sites are believed to arise from dehydroxylation of the zeolites or from the presence of polyvalent ions. In the acidic zeolite catalysts of the present invention, Bronsted and/or Lewis sites can be present.

Particular characteristics of the 8-ring zeolites mentioned above are discussed in the following paragraphs.

Zeolite rho is a small-pore synthetic zeolite which can be described by the formula:

$$(Na,Cs)_{12}Al_{12}Si_{36}O_{96} \cdot 44H_2O.$$

The structure and synthesis of this synthetic zeolite are described by Robson et al., "Synthesis and Crystal Structure of Zeolite Rho—A New Zeolite Related to Linde Type A", *Advances in Chemistry Series* 121 (American Chemical Society 1973), and Robson, U.S. Pat. No. 3,904,738. The combined disclosures of these references are incorporated by reference herein.

The cationic species $Na^+$ and $Cs^+$ present in rho zeolites can be exchanged for protons in a conventional ion exchange with $H^+$, or for ammonium ions to prepare an ammoniated form ($NH_4$—rho), which is subsequently converted to the acid form by calcination at elevated temperatures.

The crystal structure of zeolite rho is characterized by large cuboctahedral cages linked by double 8-rings, defining pore openings of approximately 3.9 Å by 5.1 Å (0.39×0.51 nm). One unusual characteristic of the structure of zeolite rho is the presence of two independent 3-dimensionally-connected systems of channels. A further unique structural feature, described by Parise et al., *J. Phys. Chem.* 88:1635 (1984) is a structural change occurring upon dehydration which results in an increase in ellipticity of the aforementioned 8-ring pore openings. If a dehydrated sample of zeolite rho is heated further, an increase in unit cell dimensions results, accompanied by a decrease in ellipticity of the 8-ring pore openings.

Zeolite rho is synthesized in a Na-Cs form substantially according to the procedure of Robson, U.S. Pat. No. 3,904,738. In one method of preparing the H-form employed in the process of this invention, $Na^+$ and $Cs^+$ ions are exchanged for $NH_4^+$ ions and the resulting $NH_4^+$ form deammoniated by calcination at 400° C. to 800° C. Although ion exchange of ammonium for $Na^+$ and $Cs^+$ ions may be incomplete in any given experiment, typically leaving 0.5–1.0 Cs per unit cell, the product of ion-exchange is referred to herein as $NH_4$-rho. Similarly, although deammoniation of $NH_4$-rho may not result in complete conversion of all $NH_4^+$ sites to H+ or other acid sites, particularly when a sample is calcined at lower temperatures, the resulting product is referred to herein as zeolite H-rho.

It is known (Robson, U.S. Pat. No. 3,904,738; Barrer et al., *Proc. 5th Conf. on Zeolites*, Naples, 1980, pp. 20-29) that small amounts of chabazite and pollucite impurities are frequently found in rho preparations. It is believed that some of these impurities and small quantities of residual gel are either not selective or less selective to dimethylamine than zeolite rho, and thus might reduce the selectivity to a degree dependent upon the quantity present in individual samples.

Zeolite ZK-5 is a synthetic zeolite first described by Robson, U.S. Pat. No. 3,720,753. The disclosure of this patent, which provides details regarding synthesis of the ZK-5 family of zeolites, is incorporated by reference herein. The structure of ZK-5 consists of truncated cuboctahedra linked by hexagonal prisms and enlarged double 8-rings with openings of 3.9 Å. ZK-5 zeolites can be characterized by the following formula:

$(K,Cs)_{30}Al_{30}Si_{66}O_{192}.98 H_2O$.

The cationic species K+ and Cs+ present in ZK-5 zeolites can be exchanged for protons in a conventional exchange with H+ or by conversion to an ammoniated form (NH4-ZK-5) which is subsequently converted to the acid form by calcination at elevated temperatures.

Zeolite ZK-5 is synthesized in a K-Cs form substantially according to the procedure of Robson, U.S. Pat. No. 3,720,753. In one method of preparing the H-form employed in the process of this invention, K+ and Cs+ ions are exchanged for NH4+ ions and the resulting NH4+ form deammoniated by calcination at 400° C. to 700° C. Although ion exchange of ammonium for K+ and Cs+ ions may be incomplete in any given experiment, typically leaving 2-5 Cs per unit cell, the product of ion-exchange is referred to herein as NH4-ZK-5. Similarly, although deammoniation of NH4-ZK-5 may not result in complete conversion of all NH4+ sites to H+ or other acid sites, particularly when a sample is calcined at lower temperatures, the resulting product is referred to herein as zeolite H-ZK-5.

Identification of zeolite Na, Cs-rho or zeolite K, Cs-ZK-5 is generally made by X-ray powder diffraction. The integrated intensities of the observed X-ray peaks can be used as a measure of zeolite crystallinity. High intensities indicate a highly crystalline porduct, while low intensities indicate less crystalline material. However, as crystallite size falls below about 50 nm, X-ray diffraction peaks broaden (H. P. Klug and L. E. Alexander, *X-Ray Diffraction Techniques*, Wiley-Interscience, N.Y., 1974). When crystallite size falls below about 2-6 nm, the peaks become so broad that they are difficult to detect by conventional analog recording spectrometers.

However, despite a lack of measurable X-ray peak intensity, such "X-ray amorphous" zeolite crystallites are capable of shape selective catalysis, as recently reported by Jacobs et al., *J. Chemical Society, Chemical Communications*, p. 591 (1981). For such crystallites, zeolite crystallinity is evident from infra-red spectra, sorption measurements, and catalytic shape selectivity. The acidic rho and ZK-5 zeolites of this invention can be highly crystalline, poorly crystalline, or X-ray amorphous crystallites.

When acidic rho and ZK-5 zeolites are prepared by deammoniation of a corresponding NH4-form, calcination temperatures must be sufficiently high to convert substantially all NH4+ sites to H+ or other acid sites, yet not high enough to render significant amounts of the zeolite amorphous. The presence of NH4+ in a given sample can be determined by infrared measurements. Excessive calcination can lead to collapse of zeolite crystalline structure and an amorphous state, which is to be distinguished from the "X-ray amorphous" zeolitic materials described above. The "X-ray amorphous" zeolites are obtained by limiting crystallization times, so that very small zeolite crystallites results. These crystallites exhibit characteristic zeolite selectivity, but permit rapid ingress of reactant molecules and egress of product molecules due to their small size. Truly amorphous material could provide poor catalyst performance.

Chabazite, a mineral zeolite, has a structure consisting of identical, near-spherical "chabazite cages", each composed of two 6-rings at top and bottom, six 8-rings in rhombohedral positions, and six pairs of adjacent 4-rings. Each cage, or unit, is thus interconnected to six adjacent units by near-planar, chair-shaped 8-rings. Chabazites can be characterized by the following formula:

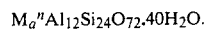

$M_a{}^n Al_{12}Si_{24}O_{72}.40H_2O$.

In this formula, the product of a and n is 12. M generally includes Ca, Mg, Na and K.

The cationic species $M^{n+}$ present in chabazites can be exchanged for protons in a conventional ion exchange with H+ or by conversion to an ammoniated form (NH4+-chabazite) which is subsequently converted to the H+ form by calcination at elevated temperatures. Generally, calcination temperatures of from 400° C. to about 600° C. are satisfactory. The resulting H-exchanged forms of natural, or mineral, chabazites are referred to herein simply as "H-chabazites."

Erionite, another mineral zeolite of interest for the present invention, exhibits a structure consisting of alternating hexagonal prisms and "cancrinite units". A cancrinite unit is formed by four planar 6-rings, each of which shares two edges with adjacent 6-rings, joined by three pairs of adjacent 4-rings. The hexagonal prisms and cancrinite units of erionite are crosslinked by 4-rings and single 6-rings to form a complex system of channels interconnected by 8-rings. Erionite has the following characteristic formula:

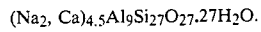

$(Na_2, Ca)_{4.5}Al_9Si_{27}O_{27}.27H_2O$.

Although the presence of channels bounded by 8-rings is a useful criterion for identification of catalysts with selectivity for dimethylamine, the accessibility of such channels to reactant and product molecules, as well as zeolite purity and crystallinity, ultimately determines the utility of a given zeolite for use in the catalytic process of the present invention.

Pore accessibility, and hence, catalytic potential, can be determined simply and directly by obtaining sorption data using a probe molecule of appropriate size. Sorption measurements are capable of detecting pore blockage and particular molecular constraints which are not necessarily detected by X-ray studies of crystal structure.

Sorption measurements are made using an apparatus substantially analogous to that described by Landolt, *Anal. Chem.* 43:613 (1971). In a typical experiment, 0.4 to 1 g of zeolite is pressed at 300-1000 psi into a self-supporting cylinder, inserted into a pre-weighed sample holder, evacuated, heated to 425° C., cooled, and then weighed in the sample holder. A sample is then exposed to sorbate vapor at 10-50% of its vapor pressure at 25° C. in a sorption manifold, removed from the sorption manifold, and weighed again to determine sorption. Sorption is expressed in weight percent, i.e., grams sorbate per 100 grams zeolite.

Zeolites exhibiting little appreciable methanol sorption, for example, less than 3 g methanol per 100 g zeolite, generally possess little catalytic activity for producing methylamines from methanol and ammonia. Such zeolites include those with blocked channels or zeolites composed of 6-ring systems as the sole path of molecular transport within the framework. Zeolites with appreciable n-propanol sorption, for example, more than 3 g per 100 g zeolite, generally are associated with high ratios of trimethylamine to dimethylamine production. Generally, active zeolites with sorptions of methanol or ethanol of 10-25 g per 100 g zeolite and little or no n-propanol sorption selectively produce monomethylamine and dimethylamine relative to trimethylamine.

Zeolite Modification

Treatment of the zeolites employed in the process of this invention results in deposition of material upon external surfaces of the treated zeolite particles, and upon external surfaces of any amorphous or crystalline contaminant particles. Thus, these external surfaces are rendered inert. No significant amount of material is deposited within the zeolite crystalline framework. The treatment results in a surface deposit consisting of sufficient material to deactivate a large majority of non-selective surface sites on zeolite and impurity particles. Throughout the specification, reference to zeolite treatment refers to treatment of both zeolite and any accompanying impurities, regardless of the relative proportion of the latter in the total catalyst composition. The amount of material required to achieve enhancement of selectivity is determined by the element selected, the compound employed to deposit the element, and the zeolite being treated. In addition, the amount is determined by the external surface area of the zeolite, the degree of zeolite crystallinity, and the amounts of impurities or amorphous phases present. Generally, the minimum amount required of the deposited element is at least about 0.05 weight percent, based upon total dry weight of zeolite. If the element is deposited from a liquid source, the amount of the element deposited will generally vary between about 0.25 weight percent to about 10 weight percent. Amounts up to 20 weight percent or more can be employed, depending upon the method of treatment and the external surface area of the zeolite. Higher levels of deposition generally result in more substantially enhanced selectivity, possibly due to narrowing of zeolite pores.

Generally, the method employed in deposition involves contacting a zeolite sample with a source of silicon, aluminum, phosphorus, or boron. The method selected must result in deposition substantially upon the external surfaces of the zeolite particles, as opposed to the channels. This can be achieved by selection of a Si, Al, P, or B source which is too large to enter the pores of the zeolite. Oxides of the deposited element can then be formed, for example, by heating. Sources of silicon, aluminum, phosphorus, or boron can be applied to zeolites as liquids, as solutes in liquids, or as vapors.

In some cases it may be desirable to utilize treatments involving more than one source compound. For example, a silicon source compound can be employed after the zeolite has been treated with an aluminum source compound, and conversely an aluminum source compound can be added after the zeolite has been treated with a silicon source compound. In this way a desirable modification of zeolite port openings provided by one material can be combined with a desirable external surface structure created by another material.

The amount of source compound needed to coat the external surface of a zeolite using aqueous solution techniques varies between samples. In the case of a representative rho zeolite having an external specific surface area of 20 m$^2$/g, about 1 weight percent SiO$_2$ forms a silica monolayer about 2.5 Å (0.25 nm) in thickness. Such a coating results in significantly increased selectivity of the catalyst. Increasing amounts of silica form thicker deposits. A preferred amount corresponds to that level resulting in formation of multilayers upon the zeolite external surface. This will normally be about 0.5 to 10 percent element by weight, depending upon the element used and the zeolite external specific surface area.

The mechanism of formation of a deposit from a liquid phase source on a zeolite external surface and its microstructure depend upon the source used for the treatment. Monosilicic and polysilicic acid, ethyl silicate, and basic aluminum chloride, for example, each provide a different mechanism of deposition. Thus, the end result can be very different depending upon whether the material was deposited by direct reaction of monosilicic acid with a zeolite surface, by hydrolysis of ethyl silicate with a zeolite containing water, or by adsorption of polymeric units of basic aluminum chloride. For this reason, the preferred amount of deposited material depends upon the source compound used for treatment. Representative liquid phase deposition techniques are described below.

Treatment with Silicon Source Compounds

Representative examples of silicon source compounds suitable for use in forming modified zeolites include silicic acids, such as monosilicic acid and polysilicic acid; water-soluble silicates, such as sodium, potassium, and guanidine silicates; organic substituted silanes such as methoxy and ethoxy silanes (tetramethyl) and tetraethyl orthosilicates, respectively) and silicones characterized by the formula

where R$^1$ is halogen, hydroxy, alkyl, aralkyl, or haloalkyl, and R$^2$ is hydrogen, halogen, hydroxy, alkyl, aralkyl, or haloalkyl. Examples of such silicones are dimethylsilicone and methylhydrogensilicone. The foregoing list is intended to be suggestive rather than exhaustive, and other equivalents will be apparent to those skilled in the art.

Silicon source compounds, whether solid or liquid, are conveniently applied to a selected zeolite when dissolved in a suitable solvent. For example, in the case of silicic acids, a preferred solvent is water. However, solids concentration, pH, and temperature must be controlled to prevent either depolymerization or excessive polymerization. Monosilicic acid is stable only at low silica concentrations, low pH, and low temperatures. Conditions for stability of monosilicic acid are reviewed by Iler, *The Chemistry of Silica*, Chapter III, (Wiley-Interscience, New York, 1979).

Excellent results can be obtained using monosilicic acid (MSA) under carefully controlled conditions. Monosilicic acid apparently reacts first with anionic $SiO^-$ and $AlO^-$ sites on the external surface of the zeolite being treated. It has been suggested that silicic acid monomer reacts more rapidly with surface $SiO^-$ having a pKa from 6 to 7, than with monomeric $(OH)_3SiO^-$ species in solution having a pKa of about 9.3. The condensation reaction is believed to involve, as a first step, the reaction

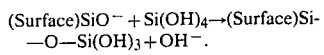
(Surface)SiO$^-$ + Si(OH)$_4$ → (Surface)Si—O—Si(OH)$_3$ + OH$^-$.

Similarly, Si(OH)$_4$ is expected to react more rapidly with highly acidic zeolite surface $AlO^-$ sites, since at a given supersaturation with monomer, the solubility of an aluminosilicate surface is less than that of a pure silanol surface. In the case of $AlO^-$ sites, the condensation reaction is believed to involve, as an initial step, the reaction

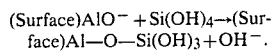
(Surface)AlO$^-$ + Si(OH)$_4$ → (Surface)Al—O—Si(OH)$_3$ + OH$^-$.

If a zeolite slurry is not treated with silicic acid under carefully controlled conditions of concentration, temperature, and pH, uncontrolled polymerization in the liquid phase is likely to occur, resulting in formation of hydrous silica particles or aggregations of such particles in the slurry and negligible deposition on the zeolite. However, if MSA is slowly added under controlled conditions, silica appears to be deposited on the zeolite surface in increasing amounts.

If a source such as tetraethylorthosilicate (TEOS) is employed, it is preferable to use a solvent other than water to avoid premature hydrolysis in the solvent. Preferably, TEOS or its equivalents are dissolved in a nonpolar organic solvent, for example, toluene, benzene, xylenes, n-hexane, heptane, chloroform or carbon tetrachloride. The resulting solution is then brought into contact with a selected zeolite. Water on the zeolite surface, or in communication with the zeolite surface, reacts with the dissolved TEOS, resulting in hydrolysis at the zeolite surface and formation of hydrated silica species which rapidly react with the zeolite surface rather than polymerize in the solvent phase. Once hydrolyzed silica forms on the zeolite surface, further polymerization by reaction of TEOS with hydrolyzed zeolite-bound silica results in formation of a growing silica layer on the zeolite surface. Diffusion of water from the zeolite interior through channels or ports to the zeolite surface results in formation of thicker deposits in the vicinity of such ports or openings. Thus, the resulting deposit substantially neutralizes the strong surface acidity of the zeolite, while creating narrower, more tortuous paths for reactants to enter and products to exit the zeolite during catalysis. Other hydrolyzable silicon source compounds are silicon tetrachloride and tetramethylorthosilicate.

Following deposition of a silicon source compound, the resulting zeolite is calcined by heating. Temperatures at which calcination is conducted are determined by the thermal stability of the zeolite and by the nature of the deposit applied.

For zeolites treated with ethyl silicates, calcination should be conducted at a minimum temperature of 300° C. Preferred calcination conditions involve heating to 450° C. to 550° C. in air for 2 to 3 hours. Treatment via hydrolysis of ethyl silicates at room temperature can produce organic residues consisting of partially hydrolyzed or unreacted ethyl silicates. Thus, thermal treatment must be accomplished under conditions which promote decomposition of the ethyl silicate residues and volatilization of the organic group, without loss of silica by direct volatilization of undecomposed ethyl silicate species.

Zeolites treated with silicic acids can be calcined in vacuum, air, nitrogen, or other inert gases, at a minimum temperature of 250° C. Calcination in air at 450° C. to 550° C. for 2 to 3 hours is preferred.

Treatment with Aluminum Source Compounds

Representative examples of aluminum source compounds suitable for use in forming modified zeolites include aluminum salts, for example, aluminum chloride and aluminum nitrate; basic aluminum salts, for example, basic aluminum chloride and basic aluminum nitrate; basic aluminum compounds made with organic acids; aluminum organometallic compounds; and aluminate salts, for example, sodium aluminate. These compounds can be applied to zeolite surfaces to produce a deposit of alumina when the treated zeolite is heated in the presence of oxygen.

Basic aluminum salts and soluble aluminates are preferred relative to "neutral" aluminum salts in view of their more favorable absorption characteristics on siliceous surfaces. The neutral salts are characterized by the octahedral $Al(H_2O)_6^{3+}$ ion, while basic salts have a skeleton characterized by

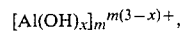
$$[Al(OH)_x]_m^{m(3-x)+},$$

wherein the charge of a single complex ion is less than 3. Soluble aluminates are characterized by the $AlO^-$ tetrahedral aluminate ion.

$Al(H_2O)_6^{3+}$ ions adsorb reversibly to siliceous surfaces and tend to neutralize the negatively charged zeolite surface. In contrast, basic aluminum ions form low polymeric units and adsorb irreversibly, tending to decrease, or even reverse, the surface charge of siliceous compounds where such surface charge is low, for example, in the case of silica. For purposes of the present invention, basic aluminum salts such as basic aluminum chloride of basic aluminum nitrate are preferred, since they permit controlled deposition of aluminum upon zeolite surfaces.

Basic aluminum compounds are described by Tanake, *American Perfumer and Cosmetics* 77:25 (1962). The compounds are formed by combination of a cation consisting of a single aluminum ion and more than one OH$^-$ group, or a polycation composed of such cations with inorganic or organic acids. The adsorption characteristics of such compounds on siliceous materials are known, and for this reason these compounds are used, for example, as water clearing agents.

Basic aluminum compounds can be characterized by the general formula

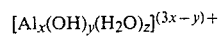
$$[Al_x(OH)_y(H_2O)_z]^{(3x-y)+}$$

where $3x > y$. When $3x = y$, basic aluminum ion precipitates as aluminum hydroxide. Thus, in the case of basic aluminum compounds, the ligand $H_2O$ of $[Al(H_2O)_6]^{3+}$ is partially replaced by $OH^-$ groups.

A selected aluminum source compound is slurried at about 23° C. in an aqueous media with a zeolite to be coated, for a time sufficient to permit adsorption of aluminum ions by the zeolite surface. Following filtration and washing with water to remove ionic contaminants, the reesulting material is calcined by heating to 450° C. to 550° C. for 2 to 6 hours in vacuum, air, nitrogen, or other inert gases.

Treatment with Boron or Phosphorous Source Compounds

Representative examples of phosphorus and boron source compounds suitable for use in forming the phosphorus and boron treated zeolites useful in the process of the instant invention include triethyl-, trimethyl-, and trihexylphosphite, and trimethyl-, triethyl-, tri-n-propyl-, and tri-n-butyl borate. However, it should be noted that other phosphorus and boron compounds, for example, various phosphite esters, phosphorus halides, phosphines, phosphates, phosphites, borate esters, boron halides, boranes, borates, alkyl borates and borazines, etc., can be employed with equivalent results. Triethyl- and trimethyl-phosphite and triethyl- and trimethyl-borate are examples of hydrolyzable phosphorus and boron source compounds.

These source compounds are contacted with a zeolite to be treated as liquids or as solutions in liquids. Calcination can then be conducted by heating the treated zeolite at a temperature from 300° C. to 800° C. for 2 to 24 hours, in vacuum, air, nitrogen, or other inert gases.

Vapor Phase Deposition

Representative examples of compounds suitable for use in vapor phase depositions include silicon tetrachloride, hexamethyldisilazane, dichlorodimethylsilane, trimethylchlorosilane, trimethylaluminum, trimethylphosphite, triethylphosphite, trimethylborate, triethylborate, etc. The foregoing list is intended to be suggestive, and other equivalents will be apparent to those skilled in the art.

The vapor phase deposition involves contacting a hydrogen form of the zeolite along with any contaminants with the vapors of the compound of choice for a period of time of the order of minutes to hours. The use of fully dehydrated zeolite is preferred although partially dehydrated and fully hydrated zeolite may be used. The vapors react with the surface active sites. However, unlike the liquid phase depositions, no further reaction, i.e., multilayer formation, is possible in most cases. This is especially true when dehydrated zeolite is used.

Surface Characteristics of Treated Zeolites

Deposition on zeolite external surfaces can be monitored by straightforward techniques. For example, changes in zeolite surface pKa can be measured to estimate the extent of deposition upon a zeolite surface. Zeolites in the $H^+$ form behave as strong acids, with low surface pka's. Depositing silica, alumina, or the other materials employed in accordance with the present invention on such zeolites results in reduction of surface acid strength, or an increase in pKa. Improvements in catalytic selectivity are directly related to the extent of coating coverage and to the form of the coating structure.

A simple approach to mesurement of zeolite surface pKa involves use of Hammett indicators with molecular diameters larger than the channel apertures, or surface ports, of the zeolite to be tested. Table I, below, provides a list of Hammett indicators which are suitable for use in estimating external surface pKa's of 8-ring zeolites. The molecular diameter of each of the five indicators listed is larger than the channel apertures of the 8-ring zeolites employed in the present invention.

TABLE I

| Hammett Indicators for Determining Surface pKa of Silica-Coated Zeolites | | | | | |
|---|---|---|---|---|---|
| | | $H_2SO_4$ Equivalent | Color of Toluene Solution | | |
| Indicator | pKa | (Wt %) | neutral | basic | acidic |
| 4-phenylazo-1-naphthylamine | +4 | $5 \times 10^{-5}$ | yellow | yellow | red (purple) |
| 2-amino-5-azo-toluene | +2 | $5 \times 10^{-3}$ | yellow | yellow | red (pink) |
| dicinnamal-acetone (DCA) | −3 | 48 | colorless | yellow | red |
| Benzalacetophenone (chalcone) | −5.6 | 71 | colorless | colorless | yellow |
| anthraquinone | −8.2 | 90 | colorless | colorless | yellow |

Hammett indicators can be used to test the extent of zeolite coating according to the following procedure. First, a zeolite sample to be tested is calcined at 450° C. to 550° C. for 2 hours in a stream of air. Then, the sample is allowed to cool, and then sealed in a dry container while still relatively hot (about 150° C.). Hammett indicator solutions are prepared by dissolving 2 mg of each indicator to be used in 250 mL dry toluene, preferably over a molecular sieve. Using glovebag techniques to assure dryness, the zeolite sample is transferred under a dry nitrogen atmosphere to dried vials, and 2 or 3 mL of each indicator solution are added to separate vials containing zeolite. After the vials are sealed, the resulting dispersions are swirled gently and allowed to settle. At this point, the color of the zeolite surface and of the solution are observed. The use of Hammett indicators to measure surface pKa is illustrated by the following experiment.

Zeolite H-rho was prepared substantially according to the procedures described by Robson, U.S. Pat. No. 3,904,738. Following ion exchange by contacting the zeolite with a $NH_4NO_3$ solution, the resulting ammoniated zeolite was converted to its H-form by calcination. A portion of the resulting sample of zeolite H-rho was immersed in tetraethylorthosilicate (TEOS) for 2 hours, filtered, dried at room temperature overnight, and then calcined in flowing $N_2$ at 550° for 3 hours. The resulting $SiO_2$-treated H-rho and a sample of the untreated H-rho used as starting material were then calcined at 450° for 2 hours in a stream of air, and transferred to a sealed container while still hot.

Hammett indicator solutions were prepared in dry toluene substantially as previously described, and added to sealed vials containing samples of the treated and untreated zeolite H-rho prepared as described above. The colors of the resulting mixtures were compared to the color ranges for the Hammett indicators employed. and the results used to estimate surface pKa.

To evaluate catalytic performance, two grams each of the foregoing treated and untreated preparations of zeolite H-rho were placed in separate stainless-steel U-tube reactors 0.125 in (0.32 cm) in diameter and about 12 in (30 cm) in length. In separate experiments, each reactor was heated to about 300° in a fluidized sand bath. Reactants methanol and ammonia were fed as liquids to a preheater, vaporized, and passed through each reactor into contact with the catalyst sample. The reactor effluent was analyzed by gas chromatography for methanol, ammonia, dimethylether, and mono-, di-, and trimethylamine.

The results of the evaluation of surface pKa by use of Hammett indicators, and of the catalysis tests described above, are shown in Table II below. The results suggest that significant changes in surface pKa are attributable to surface deposition in accordance with the present invention. The data indicate that untreated zeolite H-rho exhibits a surface pKa between about $-5$ and about $-8$. Treating with TEOS as a silicon source results in a shift in pKa to a value greater than about $+4$. In addition, this shift in surface pKa is correlated with improved selectivity for DMA in the catalyzed reaction of methanol and ammonia.

Measurement of zeta potential, which is the electrokinetic potential of a treated zeolite as a function of pH in a dilute electrolyte, can also be employed to evaluate the effects of surface deposition. Untreated zeolite H-rho indicated a negative zeta potential of about $-57$ mV at pH 2.6, which remained relatively constant up to about pH 6. In contrast, the sample of zeolite H-rho which had been treated with TEOS behaved more like a particle of pure silica. It indicated a negative zeta potential of $-30$ mV, which increased with pH to more than $-55$ mV at pH 6.

The process variables to be monitored in practicing the process of the present invention include C/N ratio, temperature, pressure, and methanol/DMEs space time. The latter variable is calculated as catalyst mass divided by mass flow rate of methanol and DME introduced to a process reactor, and is expressed in hours (mass catalyst/mass MeOH and DME fed per hour).

Generally, if process temperatures are too low, reduced conversion of reactants to dimethylamine will result. On the other hand, if temperatures are excessively high, equilibrium conversions and catalyst deactivation can occur. Preferably, temperatures are maintained between about 300° C. and about 400° C., with lower temperatures within this range being particularly preferred in order to minimize catalyst deactivation. At relatively low pressures, products must be refrigerated to condense them for further purification, adding cost to the overall process. However, excessively high pressures require costly thick-walled reaction vessels. Preferred pressures range from 10-500 psi (70-3000 kPa). Short methanol/DME space times result in low conversions and tend to favor production of monomethylamine. Long methanol space times may result either in inefficient use of catalyst, or production of an equilibrium distribution of methylamines at very high conversions. Generally, methanol/DME times of 0.10-80 hours are satisfactory, with methanol space times of 0.10-1.5 hours being preferred (corresponding to methanol/DME space velocities of 0.013-100 g of methanol and DME/g of catalyst/hour, preferably 0.67-10 g of methanol and DME/g of catalyst/hour).

The reactant ratio of methanol to ammonia, herein expressed as the C/N ratio (g atoms C/g atoms N), is

TABLE II

| | Surface pKa and Catalytic Performance of TEOS-Treated and Untreated Samples of Zeolite H—Rho | | | | | | |
|---|---|---|---|---|---|---|---|
| | pKa of Indicator | | | | | MeOH—MA | Selectivity |
| Sample | +4 | +2 | −3 | −5.2 | −8.2 | Conversion (%) | to DMA (%) |
| Untreated | +++ | +++ | ++ | + | 0 | 88 | 44 |
| Treated | 0 | 0 | 0 | 0 | 0 | 84 | 71 |

Legend: ++ = acidic; + + = weakly acidic; + = very weakly acidic; 0 = not acidic.

Process Conditions

As previously noted, the process of the present invention comprises reacting methanol and/or dimethylether (DME) and ammonia, in amounts sufficient to provide a carbon/nitrogen (C/N) ratio from about 0.2 to about 1.5, at a temperature from about 250° C. to about 450° C., in the presence of catalytic amount of a modified acidic zeolite selected from the group consisting of chabazite, erionite, ZK-5, and rho, the zeolite having been modified by treatment with one or more compounds containing at least one element selected from the group consisting of silicon, aluminum, phosphorus, and boron, to deposit thereon at least 0.05 weight percent of the element. Reaction pressures can be varied from 1-1000 psi (7-7000 kPa) with a methanol/DME space time of 0.01 to 80 hours. The resulting conversion of methanol and/or DME to methylamines is generally in excess of 85% (on a mole basis) and selectivity (on a mole basis) to dimethylamine is generally greater than 50%. In addition, the selectivity to and yield of TMA is suppressed. Thus, molar yields of dimethylamine generally exceed 50% and molar yields of TMA are generally less than 20% under the process conditions of the present invention.

critical to the process of the present invention. As the C/N ratio is decreased, production of monomethylamine is increased. As the C/N ratio is increased, production of trimethylamine increases. Catalyst deactivation is also greater at high C/N ratios. Accordingly, for best results, C/N ratios should be maintained between 0.2 to 1.5, and preferably from 0.5 to 1.2 in conducting the process of the present invention.

The efficiency of the process of the invention is measured by overall conversion of methanol and/or DME to methylamines (MA), and by selectivity of dimethylamine production. For example, if methanol is used as the sole reactant, overall conversion of methanol is determined by comparison of the amount (in moles) of methanol in the product mixture, which is considered to be unconverted, to the amount in the reactant feed. Thus, overall methanol conversion, in percent, is given by:

$$100 \left( 1 - \frac{\text{Moles MeOH in product}}{\text{Moles MeOH in feed}} \right)$$

Conversion of methanol to methylamines, in percent, is given by:

$$100 \left( 1 - \frac{\text{Moles MeOH in product} + 2 \text{ (Moles DME in product)}}{\text{Moles MeOH in feed}} \right)$$

Conversion of methanol to monomethylamine (MMA) in percent, is given by:

$$100 \left( \frac{\text{Moles MMA}}{\text{Moles MeOH in feed}} \right)$$

Similarly, conversion of methanol to dimethylamine (DMA), in percent, is given by:

$$100 \left( \frac{2 \text{ (Moles DMA)}}{\text{Moles MeOH in feed}} \right)$$

Conversion of methanol to trimethylamine (TMA), in percent, is given by:

$$100 \left( \frac{3 \text{ (Moles TMA)}}{\text{Moles MeOH in Feed}} \right).$$

Finally, selectivity to DMA is calculated by analysis of product composition. Thus, selectivity to DMA, in percent, is provided by the following expression:

$$100 \left( \frac{2 \text{ [DMA]}}{\text{[MMA]} + 2 \text{ [DMA]} + 3 \text{ [TMA]}} \right)$$

For efficient operation, the catalyst must be selective at high methanol conversions (87–98%) and a C/N ratio of 0.5–1.2.

In practicing the process of the invention, it may be desirable to combine the zeolite catalyst with another material resistant to the temperature and other conditions employed in the process. Such matrix materials include synthetic or natural substances such as clays, silica, and/or metal oxides.

Comparison of selectivities for different samples is best made at similar conversions, since selectivity changes with conversion. At low conversions, MMA production is favored; at very high conversions, the reaction will approach an equilibrium distribution and thus result in increased TMA production.

The process of the present invention is further illustrated by the following examples, wherein all temperatures are expressed in degrees Celsius (°C) and all percentages are by weight unless otherwise indicated. In composition determinations, it was assumed that there were 96 oxygen atoms per unit cell for zeolite rho and 192 oxygen atoms per unit cell for zeolite ZK-5. Analysis determined the amounts of the various cations present and the amount of hydrogen was taken to be the difference.

EXAMPLES 1-4

Examples 1-4, the results of which are summarized in Tables III and IV, demonstrate that selectivity to DMA of 8-ring zeolites is increased by coating with silica. In each of these examples silica deposits were prepared by treatment with TEOS. For the zeolites H-chabazite (Durkee), H-erionite, and H-ZK-5, comparisons of catalytic performance with and without silica treatment are set forth in Table III. Comparisons of catalytic performance of treated and untreated zeolite H-rho are set forth in Table IV, below. Generally, the results summarized in Tables III and IV indicate that yields of trimethylamine are significantly reduced over a wide range of reactant flow rates and methanol conversions over coated zeolite catalysts. In addition, at higher pressures, yields of DMA are significantly increased, while yields of TMA are further reduced.

EXAMPLE 1

Zeolite H-chabazite was prepared as follows. 50 g of mineral chabazite from a source near Durkee, Oregon were heated in flowing $N_2$ at 500° for 10 hours, then contacted three times, for one hour each time, with 500 mL of 10% $NH_4NO_3$ at 80°. The resulting ammonium ion-exchanged chabazite was dried and heated by raising the temperature 50° per hour to 500°. The sample was then heated at 500° for 10 hours. The resulting H-chabazite indicated the following composition upon analysis: 0.63% MgO, 0.26% $Na_2O$, 0.38% CaO, 0.05% $K_2O$, 2.47% $Fe_2O_3$, 11.35% $Al_2O_3$, 60.7% $SiO_2$ (Si/Al=4.53).

A portion of this material was exposed to the ambient atmosphere, immersed in tetraethylorthosilicate (TEOS) for 2 hours, filtered, dried at about 23° overnight, and then heated in flowing $N_2$ at 550° for 3 hours. The resulting material was pressed into a wafer at 20,000 psi, crushed and sieved to provide a 20 to 40 mesh fraction.

0.95 grams of the resulting TEOS-treated H-chabazite were placed in a stainless-steel U-tube reactor as previously described. The reactor was heated to the temperature indicated in Table III, below, while reaction pressure was maintained at atmospheric pressure (14.7 lb.-in$^{-2}$; 101 kPa). Reactants methanol and ammonia were fed to a preheater as a liquid at a molar ratio of about 1, vaporized, and then passed through the reactor into contact with the catalyst. Reactant flow rates are listed in Table III.

The reactor effluent was analyzed by on-line gas chromatography for ammonia, dimethylether, methanol, water, and mono-, di-, and trimethylamine. The percentage conversions of methanol (overall), of methanol to methylamines (MA), and the percentage selectivities of conversion to each of the methylamine species are given in Table III, below. That portion of methanol converted to other than methylamines was assumed to have been converted to dimethylether in this example and in each of the following examples and comparative experiments.

A 2 g sample of untreated H-chabazite used as starting material in the treatment process was also evaluated for catalytic performance substantially as described above. The results of these tests are set forth in Table III, below.

EXAMPLE 2

Zeolite H-erionite was prepared by heating 54 g of Linde E-10 erionite under slowly flowing $N_2$ at 500° for 10 hours, and then contacting the resulting material three times, for one hour each time, with 470 mL 10% $NH_4NO_3$ at 80°. The resulting ammoniated material was dried at 110°, heated in flowing $N_2$ by increasing the temperature 50° per hour to 500°, and then held at 500° for 10 hours.

A portion of the resulting H-erionite was treated with TEOS as described above in Example 1. Two grams of the resulting TEOS-treated H-erionite were evaluated for catalytic performance substantially as described in Example 1, above. The catalytic performance of uncoated H-erionite was also tested as a comparison. The results of these experiments are shown in Table III, below. In addition to a significant increase in selectivity to DMA, silica coating of H-erionite provides a significant decrease in product TMA.

above. Two grams of the resulting product and two grams of untreated H-ZK-5 were each evaluated for catalytic activity substantially as described in Example 1, above. The conditions employed and the results obtained are set forth in Table III, below. TEOS treatment of H-ZK-5 increases catalytic selectivity to DMA and decreases catalytic selectivity to TMA in the reaction of methanol and ammonia.

TABLE III

Effects of Silicon Treatment Upon Catalytic Selectivity of H—Chabazite, H—Erionite, and H—ZK-5 Zeolite Catalysts

| Example | Zeolite Catalyst | Temp. (°C.) | Reactant Flow (mL/hr) | MeOH Conv. (%) | MeOH—MA Conv. (%) | Selectivity (%) | | |
|---|---|---|---|---|---|---|---|---|
| | | | | | | MMA | DMA | TMA |
| 1 | H—Chabazite TEOS-treated | 400 | 1 | 97 | 92 | 17 | 58 | 25 |
| | H—Chabazite Untreated | 400 | 4 | 98 | 93 | 16 | 51 | 33 |
| 2 | H—erionite TEOS-treated | 400 | 0.2 | 97 | 79 | 27 | 45 | 28 |
| | H—erionite Untreated | 400 | 2 | 98 | 96 | 15 | 27 | 58 |
| 3 | H—ZK-5 TEOS-treated | 350 | 2 | 98 | 97 | 22 | 73 | 6 |
| | H—ZK-5 Untreated | 325 | 2 | 99 | 92 | 16 | 32 | 52 |

EXAMPLE 3

Zeolite H-ZK-5 was prepared according to the following procedure. A mixture of 68 mL 4M $K_2AlO_2OH$ and 23 mL 50% CsOH was added to 126 mL aqueous colloidal silica sol containing about 40% solids (Ludox ® AS-40 Colloidal Silica-Technical). These ingredients were combined in a polypropylene container and heated to 100°. After 2 days, 20 mL $H_2O$ were added and the container transferred to a steam bath at 90°. After 11 days, the resulting product was washed thoroughly with distilled $H_2O$ and dried. An X-ray diffraction pattern obtained for this material was in agreement with that disclosed by Robson, U.S. Pat. No. 3,720,753, for K,Cs-ZK-5. A cubic cell dimension estimate was a = 1.867 nm. This product was contacted three times, for 16 hours each time, with a 20% $NH_4NO_3$ solution at 80°. Following this treatment, the resulting ammoniated material was washed with distilled $H_2O$, dried, and heated at 500° for 16 hours. The resulting product, herein designated H-ZK-5, indicated the following formula upon analysis:

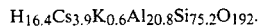
$H_{16.4}Cs_{3.9}K_{0.6}Al_{20.8}Si_{75.2}O_{192}$.

A portion of the H-ZK-5 prepared above was treated with TEOS substantially as described in Example 1,

EXAMPLE 4

Zeolite H-rho was prepared according to the following procedure. A mixture of 200 mL 4M $Na_2AlO_2OH$, 56 mL 50% CsOH, and 26 g NaOH was added to 720 mL of an aqueous colloidal silica sol containing approximately 30% $SiO_2$ (Ludox ® LS Colloidal Silica-Technical; pH at 25°=8.4) in a polytetrafluoroethylene container, and allowed to stand at 25° for 9 days. The resulting mixture was then heated at 100° for 7 days, permitted to stand 3 additional days at 25°, and then reheated at 100° for 24 hours. The resulting product was washed with distilled $H_2O$ and then contacted 3 times, for about 16 hours each time, with a 20% $NH_4NO_3$ solution at 80° to produce $NH_4$-rho, which indicated the following formula upon analysis: $(NH_4)_{9.6}Cs_{1.1}Al_{10.3}Si_{37.7}O_{96}$·42.9 $H_2O$. The $NH_4$-rho was converted to H-rho by calcination at 550° in air for 18 hours. A portion of the resulting H-rho was treated with TEOS substantially as described in Example 1, above.

In a series of experiments conducted substantially similarly to the procedure described in Example 1, methanol and ammonia were contacted with 2 gram samples of the TEOS-treated H-rho and untreated H-rho prepared above. Reaction pressures and flow rates were varied between experiments. The conditions employed and the results obtained are set forth in Table IV, below.

TABLE IV

Effects of Silicon Treatment upon Catalytic Selectivity of Zeolite H—rho

| Run | Treatment | Reaction Pressure (PSIA/kPA) | Temp. (°) | Flow (mL/hr) | MeOH Conv. (%) | MeOH—MA Conv. (%) | Selectivity (%) | | |
|---|---|---|---|---|---|---|---|---|---|
| | | | | | | | MMA | DMA | TMA |
| 4.01 | None | 14.7/101 | 300 | 16 | 67 | 65 | 31 | 57 | 13 |
| 4.02 | None | 14.7/101 | 300 | 12 | 80 | 78 | 23 | 60 | 16 |
| 4.03 | None | 14.7/101 | 300 | 8 | 86 | 84 | 21 | 60 | 20 |
| 4.04 | None | 14.7/101 | 300 | 6 | 92 | 90 | 18 | 60 | 22 |
| 4.05 | None | 14.7/101 | 300 | 4 | 98 | 96 | 16 | 59 | 25 |
| 4.06 | TEOS | 14.7/101 | 300 | 8 | 64 | 62 | 33 | 61 | 6 |

TABLE IV-continued

Effects of Silicon Treatment upon
Catalytic Selectivity of Zeolite H—rho

| Run | Treatment | Reaction Pressure (PSIA/kPA) | Temp. (°) | Flow (mL/hr) | MeOH Conv. (%) | MeOH—MA Conv. (%) | Selectivity (%) MMA | DMA | TMA |
|---|---|---|---|---|---|---|---|---|---|
| 4.07 | TEOS | 14.7/101 | 300 | 6 | 80 | 77 | 25 | 66 | 9 |
| 4.08 | TEOS | 14.7/101 | 300 | 4 | 89 | 86 | 21 | 67 | 12 |
| 4.09 | TEOS | 14.7/101 | 300 | 2 | 98 | 95 | 16 | 70 | 14 |
| 4.10 | None | 120/830 | 300 | 48 | 66 | 65 | 29 | 63 | 7 |
| 4.11 | None | 120/830 | 300 | 32 | 86 | 85 | 19 | 68 | 12 |
| 4.12 | None | 120/830 | 300 | 16 | 92 | 91 | 18 | 70 | 12 |
| 4.13 | None | 120/830 | 300 | 8 | 98 | 97 | 15 | 63 | 22 |
| 4.14 | TEOS | 120/830 | 300 | 16 | 66 | 65 | 30 | 65 | 2 |
| 4.15 | TEOS | 120/830 | 300 | 8 | 83 | 82 | 21 | 75 | 4 |
| 4.16 | TEOS | 240/1650 | 300 | 16 | 71 | 70 | 26 | 71 | 3 |
| 4.17 | TEOS | 240/1650 | 300 | 8 | 88 | 87 | 19 | 77 | 3 |

EXAMPLES 5-8

The results of Examples 5-8, which are summarized in Table V, below, indicate that selectivity for dimethylamine is increased and selectivity for trimethylamine is decreased by treating zeolite H-rho with a source of silicon, aluminum, phosphorus, or boron, and then calcining the resulting treated zeolite in air.

EXAMPLE 5

Zeolite H-rho was prepared as follows. A mixture of 200 mL 4M $Na_2AlO_2OH$, 56 mL 50% CsOH, and 32.0 g NaOH was added to 720 mL of colloidal silica (Ludox ® LS Colloidal Silica-Technical) in a polytetrafluoroethylene bottle. The resulting mixture was allowed to stand at about 25° for 6 days and then heated at 100° for 7 days. The resulting product, after thorough washing with distilled $H_2O$ and filtering, was contacted three times, for about 16 hours each time, with a 20% $NH_4NO_3$ solution at 80°. The resulting $NH_4$-rho was heated at 485° for 16 hours and zeolite H-rho was recovered. Analysis indicated the following formula: $(NH_4)_{1.5}Cs_{0.5}H_{7.9}Al_{9.9}Si_{38.1}O_{96}.16.2\ H_2O$. An X-ray diffraction pattern obtained for this material indicated a cubic rho structure having a = 1.490 nm, as well as the presence of a trace of an impurity.

A portion of the resulting H-rho was reserved for comparative testing and the balance treated with monosilicic acid according to the following procedure. A solution of sodium metasilicate was prepared by dissolving 30 g pulverized, Fisher reagent grade $Na_2SiO_3.9\ H_2O$ in 100 mL 0.1N NaOH. The silica content of this reagent, designated solution A, was 2.28 percent. A separate solution B was prepared, consisting of 0.025N $H_2SO_4$, and was cooled to 0°-5°. Meanwhile, a quantity of Dowex ® 50 sulfonic acid cation exchange resin was washed with distilled water until washings were colorless. 15 g of the resulting washed resin were added to 100 mL solution B in a beaker, while stirring and cooling in an ice bath at about 5°. At this point, 5 mL of solution A was added by intermittent jets of about 0.3 mL each, delivered by a 1 mL syringe and fine-tipped hypodermic needle. The pH of the resulting mixture was continuously maintained below 2.5 by delaying additions of solution A until the pH of the stirred, cooled mixture dropped below 2. After 5 mL of solution A had been added in this fashion, the pH of the mixture was about 2.15. The resulting clear solution of silicic acid was stored temporarily at 0°-5° in an ice-bath to prevent premature polymerization. The calculated concentration of this solution of silicic acid was 3 mg $SiO_2$ per mL.

3 g of finely powdered zeolite H-rho were dispersed in 150 mL distilled $H_2O$ by stirring with a plastic-coated magnetic stirring bar. The pH of the resulting dispersion was adjusted to 10.5 by addition of concentrated $NH_4OH$. The resulting suspension was heated to about 60°, whereupon the pH fell to about 9.0. At this point, 68 mL of the refrigerated silicic acid solution previously prepared were added dropwise to the zeolite dispersion while stirring. Portions of approximately 5 mL were added in this fashion at about 4 minute intervals. After the silicic acid had been added, the pH of the zeolite dispersion was 7.2 at 60°. The dispersion was then permitted to cool to about 25° and allowed to settle for about 64 hours without stirring. The resulting supernatant layer was analyzed for silica monomer by the silicomolybdate method disclosed by Iler, *The Chemistry of Silica* (Wiley, New York, 1979) p. 97. This analysis indicated about 135 ppm $SiO_2$, suggesting that substantially all silicic acid had been extracted from solution by the zeolite H-rho and any accompanying impurity.

The resulting silicic acid treated zeolite H-rho was recovered by centrifugation, dried overnight at 100° in a vacuum oven, and weighed. 2.87 g of dry product were obtained. 2 g of this material were pressed into a wafer at 20,000 psi, crushed, and then sieved to a 20-40 mesh powder. This material was calcined at 550° in air for 3 hours. The quantity of $SiO_2$ deposited on the zeolite and impurity surface corresponded to about 6.8 weight percent, based upon dry H-rho.

On the basis of the estimated external specified surface area of the zeolite crystals employed and the amount of $SiO_2$ consumed in the treatment process, it was estimated that the equivalent of between 10 and 18 layers of $SiO_2$ were deposited upon the zeolite surface. This estimate would correspond to a coating thickness of from 3.5 to 6.5 nm.

1.35 g of the foregoing $SiO_2$-coated zeolite H-rho were evaluated for methylamine selectivity in the catalyzed reaction of methanol and ammonia, substantially according to the procedure described in Example 1, above. A 2 g portion of untreated zeolite H-rho was similarly evaluated as a comparison. The conditions employed and the results obtained are set forth in Table V, below.

EXAMPLE 6

A portion of the zeolite H-rho prepared as described in Example 4, above, was treated with boron oxide by treatment with triethylborate according to the following procedure.

Approximately 4 g zeolite H-rho were slurried in 40 mL triethylborate for about 3 hours at 25°. After filtration from the slurry, the resulting treated zeolite was dried in flowing air. The dried zeolite was calcined by raising the temperature 50° per hour to a final temperature of 540°, and then heating at 540° for 10 hours. The resulting material was permitted to cool to about 25° and boron treated H-rho recovered.

2 g of the foregoing boron treated H-rho were evaluated for methylamine selectivity substantially according to the procedure of Example 1. A sample of untreated H-rho was similarly evaluated for comparison purposes. The conditions employed and the results obtained are set forth in Table V, below.

EXAMPLE 7

Modified zeolite H-rho was prepared by treatment of zeolite H-rho with triethylphosphite. First, zeolite H-rho was prepared according to the following procedure. A mixture of 800 mL 4M $Na_2AlO_2OH$, 224 mL 50% CsOH, and 104 g NaOH was added to 2880 mL colloidal $SiO_2$ (Ludox ® LS Colloidal Silica-Technical) in a polytetrafluoro-ethylene container and allowed to stand at 25° for 11 days. The resulting mixture was then heated at 100° for about 9 days. Product Na,Cs-rho was washed thoroughly with distilled $H_2O$ and then dried at 110°.

150 g of the foregoing Na,Cs-rho were contacted with 1.5 L 10% $NH_4NO_3$ at 90° for one hour. After filtration, the resulting material was contacted with additional $NH_4NO_3$ in the same manner two additional times. After the third exchange with ammonium ion, the resulting ammoniated zeolite was washed thoroughly with distilled $H_2O$, dried at 110°, and calcined by slowly heating at a rate of about 50° per hour to a temperature of 700°, and then heating at 700° for 10 hours. After cooling, zeolite H-rho was recovered and a portion reserved for comparative testing.

12 g of the foregoing H-rho were stirred in 50 mL triethylphosphite for 3 hours at about 25°. The resulting slurry was filtered and the treated zeolite dried in air. The dried, treated zeolite was then calcined by slow heating at a rate of about 50° per hour in air to 540°, and then heating at 540° for 10 hours in air. The resulting catalyst was recovered and evaluated for methylamine selectivity substantially according to the procedure described in Example 1. Untreated zeolite H-rho was also evaluated for comparison. The conditions employed and the results obtained are displayed in Table V, below.

EXAMPLE 8

Alumina-treated zeolite H-rho was prepared from a sample of zeolite H-rho prepared as follows. 400 mL M $Na_2AlO_2OH$, 64 g NaOH, and 112 mL 50% CsOH were added to 1440 mL colloidal silica (Ludox ® LS Colloidal Silica-Technical). The resulting mixture was permitted to stand for 4 days at 25°, and then heated 3 days at 100°. An X-ray diffraction pattern obtained for this material indicated the presence of cubic Na,Cs-rho. This material was then exchanged three times, for 18 hours each time, with fresh 27% $NH_4NO_3$ to produce zeolite $NH_4$-rho. H-rho was prepared by heating 250 g of zeolite $NH_4$-rho in a slow stream of air to 550°, and holding at that temperature for 3 hours.

5 g of the resulting preparation of zeolite H-rho were added to 50 mL distilled $H_2O$ and stirred in a blender. The pH of the resulting slurry was approximately 4.0. While continuing vigorous stirring, 2.1 g of an aqueous solution of $[Al_2(OH)_5Cl]_x$, containing 24% $Al_2O_3$, (Chlorhydrol ®, Reheis Chemical), were added dropwise. When the addition of this material was complete, the pH of the mixture had risen to 4.2. The slurry was then centrifuged to recover the treated zeolite and the supernatant was analyzed for Al. This analysis indicated approximately 0.56% Al, suggesting that about 79% of the Al added to the treatment slurry and been bound by zeolite. This corresponds to 0.14% Al or 0.27% $Al_2O_3$ on dry zeolite H-rho.

The resulting treated H-rho was washed extensively to remove traces of chloride ion. A silver nitrate test was employed to detect the presence of chloride, ans washing was continued until this test indicated no trace chloride in wash solutions. The resulting treated, washed zeolite H-rho was vacuum-dried for 16 hours at 110°. At the end of the drying step, the resulting sample weighed 4.75 g. 2 g of this preparation of alumina-treated zeolite H-rho were evaluated for methylamine selectivity in the catalyzed reaction of methanol and ammonia substantially as described in Example 1, above. 2 g of untreated zeolite H-rho were also evaluated for purposes of comparison with the preparation described above and that described in Example 10, below. The conditions employed and the results obtained are set forth in Table V, below.

EXAMPLE 9

Alumina treated zeolite H-rho was prepared as follows: First, zeolite Na,Cs-rho was prepared according to the following procedure. A mixture of 200 mL 4M $Na_2AlO_2OH$, 56 mL 50% CsOH, and 26 g NaOH was added to 720 mL of colloidal silica sol containing approximately 30% $SiO_2$ (Ludox ® LS Colloidal-Techanical) in a polytetrafluoroethylene container and allowed to stand at 25° for 5 days. The resulting mixture was then heated at 100° for 6 days and the product (zeolite Na,CS-rho) was filtered, washed and dried at 110°. This zeolite Na,Cs-rho was contacted 4 times, for about 1 hour each time, with a 10% solution of $NH_4NO_3$ at 80° with filtering between each contact. The resulting material was filtered, washed with distilled $H_2O$ and dried. 16 g of this product, zeolite $NH_4$-rho, were then calcined at 500° for about 30 hours to produce zeolite H-rho.

Three grams of the zeolite H-rho were added to 27 mL of distilled water and stirred in a blender to make approximately a 10% dispersion of zeolite in water. The pH of the slurry was 4.9. While continuing vigorous stirring, 3 mL of an aqueous solution of $[Al_2(OH)_5Cl]_x$, containing 24% $Al_2O_3$, (Chlorhydrol ®, Reheis Chemical), were added dropwise and stirring was continued for five minutes. The slurry was centrifuged to recover the solids and the supernatant analyzed for Al. This analysis indicated approximately 0.005% Al, suggesting that about 50% of the Al added to the treatment slurry was abstracted from the solution by the zeolite. This corresponds to about 0.05% Al or about 0.1% $Al_2O_3$ on dry zeolite H-rho.

The resulting treated H-rho was washed extensively to remove traces of chloride ion. A silver nitrate test was employed to detect the presence of chloride, and washing was continued until this test indicated no trace chloride in wash solutions. The resulting treated, washed zeolite H-rho was vacuum-dried for 16 hours at 110°. The resulting sample weighed 3 g. 2 g of this preparation of aluminum treated zeolite H-rho were evaluated for methylamine selectivity in the catalyzed reaction of methanol and ammonia substantially as described in Example 1. The conditions employed and the results obtained are set forth in Table V.

EXAMPLE 10

5 g of the preparation of zeolite H-rho described in Example 8, above, were slurried in 49 mL distilled $H_2O$. The pH of the resulting slurry was 4.15. One mL of a 5% $NaAlO_2$ solution was added dropwise while the slurry was vigorously agitated. At the end of this addition of sodium aluminate, the pH of the slurry was 7.6, which decreased to 6.38 in about 7 minutes. The pH was then adjusted to 8.6 by addition of about 3 mL 1N NaOH. The resulting slurry was then heated to about 70° in a water bath while stirring was continued. The pH of the slurry decreased to 7.5 during this step and was readjusted to 8.6 by addition of about 2 mL 1N NaOH. After centrifuging the slurry, the supernatant was analyzed for Al, indicating about 9 ppm Al. This result suggested that substantially all Al had been taken up from solution by the zeolite being treated. The cake resulting from the centrifugation step was then slurried in about 100 mL 10% $NH_4NO_3$, stirred at 25° for 10 minutes, and then recentrifuged. This step was repeated an additional three times. The residue from the last such treatment was slurried in 100 mL of a saturated solution of $(NH_4)_2CO_3$ in $H_2O$, centrifuged again and then washed with two 100 mL changes of distilled $H_2O$ before vacuum drying at 110°. The resulting sample of treated zeolite weighed 4.68 g. This material was calcined in air at 550° for 3 hours. 2 g of the resulting preparation of aluminum-treated zeolite H-rho were evaluated for methylamine selectivity substantially according to the procedure described in Example 1, above. The conditions employed and the results obtained are set forth in Table V, below.

TABLE V

Effects of Various Coating Treatments Upon Methylamine Selectivity of Zeolite H—Rho

| Example | Treatment Compound | Reaction Temp. (°C.) | Feed Flow (mL/hr) | MeOH Conv. (%) | MeOH—MA Conv. (%) | Selectivity (%) | | |
|---|---|---|---|---|---|---|---|---|
| | | | | | | MMA | DMA | TMA |
| 5 | $H_2SiO_3$ | 300 | 4 | 84 | 83 | 27 | 58 | 15 |
| | None | 300 | 8 | 88 | 87 | 24 | 44 | 32 |
| 6 | $B(OEt)_3$ | 300 | 1.5 | 92 | 88 | 14 | 79 | 7 |
| | None | 300 | 6 | 92 | 90 | 18 | 60 | 22 |
| 7 | $P(OEt)_2$ | 300 | 4 | 91 | 78 | 19 | 79 | 3 |
| | None | 300 | 4 | 95 | 81 | 16 | 64 | 20 |
| 8 | $[Al_2(OH)_5Cl]_x$ | 300 | 8 | 92 | 87 | 15 | 75 | 10 |
| 9 | $[Al_2(OH)_5Cl]_x$ | 300 | 10 | 89 | 86 | 13 | 66 | 21 |
| 10 | $NaAlO_2$ | 300 | 12 | 91 | 89 | 15 | 60 | 24 |
| | None | 300 | 8 | 95 | 94 | 15 | 48 | 36 |

EXAMPLES 11-14

Examples 11-14, which are summarized in Table VI, below, illustrate the variation in catalytic performance obtained when the moisture content of zeolite H-rho is varied prior to TEOS treatment.

A mixture of 200 mL 4M $Na_2AlO_2OH$, 56 mL 50% CsOH, and 26 g NaOH was added to 720 mL of colloidal silica (Ludox ® LS Colloidal Silica-Technical) in a polytetrafluoroethylene container, and allowed to stand for 7 days at 25°, followed by 13 days at 90°. A portion of the resulting zeolite Na,Cs-rho was contacted two times, for 16 hours each time, with a 20% $NH_4NO_3$ solution at 90°. The resulting $NH_4$-rho was recovered by filtration, washed with distilled $H_2O$ and then dried. Zeolite H-rho was produced from this material by calcination in air at 250° for 1 hour and then at 500° for 16 hours. A sample of the resulting zeolite H-rho was reserved for testing as a comparison.

Four samples of the foregoing preparation of zeolite H-rho were separated and allowed to absorb $H_2O$ from the atmosphere for varying times. $H_2O$ uptake was estimated by determining weight loss as a portion of each sample was heated from 25° to 300°. The results indicated that the samples had absorbed $H_2O$ as indicated below:

| Example | $H_2O$ content (%) |
|---|---|
| 10 | 2.1 |
| 11 | 8.2 |
| 12 | 12.1 |
| 13 | 14.7 |

Each of the foregoing zeolite samples was then immersed in tetraethylorthosilicate (TEOS) for 3 hours, recovered by filtration, dried overnight and then heated in flowing $N_2$ at 500°-550° for about 3 hours.

Sorption measurements were undertaken to explore the effects of the varying coating treatments upon sorption of methanol and n-propanol. Samples of the preparations of Examples 12 and 13 were placed into pre-weighed cells and evacuated. Each sample was slowly heated to 425° under vacuum and then held at 425° for 18 hours. After exposing each sample to 375 mm $O_2$ for 30 minutes to oxidize any organic material, the samples were evacuated at 425° until the pressure reached $3.7 \times 10^{-5}$ mm Hg. Each sample was then weighed again, and then exposed to 38 mm methanol vapor for 20 hours, and weighed again to determine total methanol sorption. Subtraction of methanol absorbed on the external surface of the zeolite from the total methanol sorption provided the net sorption measurements indicated in Table VI, below. Net n-propanol sorption was determined in a substantially similar manner. Table via lists net methanol (MeOH) and n-propanol (n-PrOH) sorptions (in weight percent) for each zeolite sample.

2 g of each of the above-described Silica-treated zeolite H-rho samples, as well as 2 g of the portion of untreated H-rho reserved for comparison, were evaluated for methylamine selectivity substantially as described in Example 1, above. The conditions employed and the results obtained are set forth in Table VI, below.

The results indicate that characteristics of the SiO$_2$ coating, and consequently, catalytic selectivity, can be altered by controlling the moisture present in a zeolite sample prior to treatment with TEOS. The sorption data also illustrate the effects of silica treatment upon the geometric constraints of the pore openings in zeolite H-rho.

TABLE VI

Effects of Varying H$_2$O Content Prior to TEOS Treatment of Zeolite H—Rho

| Example | Treatment Compound | H$_2$O Content (%) | Reaction Temp. (°C.) | Feed Flow (mL/hr) | MeOH Conv. (%) | MA Conv. (%) | Selectivity (%) MMA | DMA | TMA | Net Sorption (%) MeOH | n-Pr |
|---|---|---|---|---|---|---|---|---|---|---|---|
| — | None | — | 300 | 8 | 89 | 88 | 20 | 39 | 41 | 24.7 | 20.6 |
| 11 | TEOS | 2.1 | 300 | 4 | 93 | 93 | 20 | 57 | 23 | 23.7 | 11.9 |
| 12 | TEOS | 8.2 | 300 | 4 | 96 | 95 | 21 | 71 | 8 | 23.8 | 4.1 |
| 13 | TEOS | 12.1 | 300 | 4 | 97 | 97 | 20 | 74 | 6 | n.d. | n.d. |
| 14 | TEOS | 14.7 | 300 | 4 | 96 | 96 | 21 | 75 | 4 | n.d. | n.d. | n.d. = not determined

EXAMPLE 15

Zeolite H-rho was prepared according to the following procedure. First, two identical batches of zeolie Na,Cs-rho were prepared as follows. For each batch, a mixture of 400 mL 4M Na$_2$AlO$_2$OH, 112 mL 50% CsOH, and 64 g NaOH was added to 1440 mL of an aqueous colloidl silica sol containing approximately 30% SiO$_2$ (Ludox ® LS Colloidal Silica-Technical) in a polytetrafluoroethylene container, and allowed to stand at 25° for 6 days. The resulting mixture was then heated at 90° for 3 days, filtered, washed and dried. X-ray diffraction patterns of the dried product of both batches indicated the presence of zeolite Na,Cs-rho. The products of these two batches were then thoroughly mixed and then contacted 3 times, for about 1 hour each time, with a 10% solution of NH$_4$NO$_3$ at 90°, with filtering between each contact. The resulting material was then filtered, washed with distilled H$_2$O and dried. This product, zeolite NH$_4$-rho, was then calcined in air by raising the temperature 60° per hour to a final temperature of 550° and heating the material at 550° for 10 hours. The procedure described above, i.e., the contacting with NH$_4$NO$_3$ and the calcination, was repeated two times. The resulting material was zeolite H-rho.

5 g of this preparation of zeolite H-rho were placed in a quartz tube in a vertically mounted tube furnace, heated under He flow at 360° for 16 hours, and then cooled to room temperature under He flow. The sample was then contacted with a stream of helium that had first been passed through hexamethyldisilazane (HMDS). After 1 hour of contact, the HMDS was removed from the He stream and the sample was left under flowing He for an additional 16 hours.

2 g of the resulting HMDS-treated zeolite H-rho were evaluated for methylamine selectivity in the catalyzed reaction of methanol and ammonia, substantially according to the procedure described in Example 1, above. A 2 g portion of uncoated zeolite H-rho was similarly evaluated as a comparison. The conditions employed and the results obtained are set forth in Table VII.

EXAMPLE 16

10 g of zeolite H-rho, prepared using a procedure substantially similar to that described in Example 15, were placed in a quartz tube in a vertically mounted tube furnace, heated by raising the temperature 60° per hour to 550° under flowing nitrogen, further heated at 550° for 10 hours under flowing nitrogen, and then cooled to room temperature. The sample was then contacted with a stream of nitrogen that had first been passed through dichlorodimethylsilane (DCDMS) while the temperature was held at 300°. After 4 hours of contact, the DCDMS was removed from the nitrogen stream, and the sample was left under flowing nitrogen for an additional 16 hours. The sample was then thoroughly washed and dried.

2 g of this DCDMS-treated zeolite H-rho were evaluated for methylamine selectivity in the catalyzed reaction of methanol and ammonia, substantially according to the procedure described in Example 1, above. A 2 g portion of untreated zeolite H-rho was similarly evaluated as a comparison with this Example as well as with Examples 17-19. Further, 10 g of zeolite H-rho, prepared using a procedure essentially the same as that described in Example 15, were placed in a quartz tube in a vertically mounted tube furnace, heated by raising the temperature 60° per hour to 550° under flowing nitrogen, and further heated at 550° for 10 hours under flowing nitrogen and then cooled to room temperature. A 2 g portion of the resulting uncoated, doubly-calcined zeolite H-rho was evaluated for methylamine selectivity in the catalyzed reaction of methanol and ammonia, substantially according to the procedure described in Example 1, above, as a comparison with Examples 16-19.

The conditions employed and the results obtained in these experiments are set forth in Table VII.

EXAMPLE 17

10 g of zeolite H-rho, prepared using a procedure substantially similar to that described in Example 15, were placed in a quartz tube in a vertically mounted tube furnace, heated by raising the temperature 60° per hour to 550° under flowing nitrogen, further heated at 550° for 10 hours under flowing nitrogen, and then cooled to room temperature. The sample was then contacted with a stream of nitrogen that had first been passed through silicon tetrachloride (SiCl$_4$). The temperature was maintained at about 23°. After 4 hours of contact, the SiCl$_4$ was removed from the nitrogen stream, and the sample was left under flowing nitrogen for an additional 16 hours. The sample was then thoroughly washed and dried.

2 g of the resulting SiCl₄-treated zeolite H-rho were evaluated for methylamine selectivity in the catalyzed reaction of methanol and ammonia, substantially according to the procedure described in Example 1, above. The conditions employed and the results obtained are set forth in Table VII.

EXAMPLE 18

10 g of zeolite H-rho, prepared using a procedure substantially similar to that described in Example 15, were placed in a quartz tube in a vertically mounted tube furnace, heated by raising the temperature 60° per hour to 550° under flowing nitrogen, further heated to 550° for 10 hours under flowing nitrogen, and then cooled to room temperature. The sample was then contacted with a stream of nitrogen that had first been passed through chlorotrimethylsilane (CTMS). The temperature was maintaned at about 23°. After 4 hours of contact, the CTMS was removed from the nitrogen stream, and the sample was left under flowing nitrogen for an additional 16 hours. The sample was then thoroughly washed and dried.

2 g of the resulting CTMS-treated zeolite H-rho where evaluated for methylamine selectivity in the catalyzed reaction of methanol and ammonia, substantially according to the procedure described in Example 1, above. The conditions employed and the results obtained are set forth in Table VII.

EXAMPLE 19

10 g of zeolite H-rho, prepared using a procedure substantially similar to that described in Example 15, were placed in a quartz tube in a vertically mounted tube furnace, heated by raising the temperature 60° per hour to 550° under flowing nitrogen, further heated at 550° for 10 hours under flowing nitrogen, and then cooled to room temperature. The sample was then contacted with a stream of nitrogen that had first been passed through trimethylphosphite (TMP). The temperature was maintained at about 23°. After 4 hours of contact, the TMP was removed from the nitrogen stream, and the sample was left under flowing nitrogen for an additional 16 hours. The sample was then thoroughly washed and dried.

2 g of the resulting TMP-treates zeolite H-rho were evaluated for methylamine selectivity in the catalyzed reaction of methanol and ammonia, substantially according to the procedure described in Example 1, above. The conditions employed and the results obtained are set forth in Table VII.

EXAMPLE 20

Zeolite H-rho was prepared according to the following procedure. A mixture having the composition 2.80 $Na_2O \cdot 0.5\ Cs_2O \cdot Al_2O_3 \cdot 11.1\ SiO_2 \cdot 120\ H_2O$ was formed by adding 90 mL 4M $Na_2AlO_2OH$, 31.5 mL 5.79N CsOH, and 13 g NaOH to 355 mL of an aqueous colloidal silica sol containing approximately 30% $SiO_2$ (Ludox® LS Colloidal-Technical) in a polypropylene container. The resulting mixture was allowed to stand at 25° for 9 days, and then heated at 100° for 10 days. The resultoing product was washed several times and then allowed to stand in contact with a 23% $NH_4NO_3$ solution for about 65 hours to produce $NH_4$-rho. This material was then converted to H-rho by calcination at 415° in air for about 16 hours. Analysis of the resulting sample of zeolite H-rho indicated its composition to be $Cs_{0.74}Na_{0.2}H_{10.22}Al_{1.16}Si_{36.84}O_{96}$. A portion of this zeolite H-rho was heated in flowing $N_2$ at 500° for 2 hours.

6.6 g of this zeolite H-rho were placed in a quartz tube in a vertically mounted tube furnace, heated for about 1.5 hours at 370° under flowing argon, and then cooled to room temperature. The sample was then contacted with a stream of argon that had first been passed through silicon tetrachloride ($SiCl_4$), and the temperature was then raised to 500°. After 2 hours of contact at 500°, the $SiCl_4$ was removed from the nitrogen stream, and the sample was cooled to room temperature under flowing argon. The sample was then thoroughly washed and dried at 110°.

2 g of the resulting SiCl₄-treated zeolite H-rho were evaluated for methylamine selectivity in the catalyzed reaction of methanol and ammonia, substantially according to the procedure described in Example 1, above. 2 g of untreated zeolite H-rho, which had also been calcined at 500°, were similarly evaluated as a comparison. The conditions employed and the results obtained are set forth in Table VII.

EXAMPLE 21

2 g of untreated zeolite H-rho, prepared as described in Example 8, were retained in a freshly cleaned quartz tube, using fresh quartz wool. A stream of nitrogen with a flow rate of 20 mL/min was passed through the sample, while the tube was heated to 125°. 2 mL of a 2M solution of trimethylaluminum (TMA1) in toluene was then injected into the tube over a period of about 30 seconds, while maintaining the temperature at 125°. The temperlature of the sample was then increased to 520°–550° over a time interval of 20–30 minutes while pumping a 10:1 toluene:methanol solution through the tube at a flow rate of 16 mL/hour. Following this treatment, the sample was held at a temperlature of 520°–550° for about 15 minutes, and then cooled to room temperature, the flow of nitrogen was maintained throughout the procedure.

2 g of the resulting TMA1-treated zeolite H-rho were evaluated for methylamine selectivity in the catalyzed reaction of methanol and ammonia, substantially according to the procedure described in Example 1, above. 2 g of untreated zeolite H-rho were similarly evaluated as a comparison. The conditions employed and the results obtained are set forth in Table VII.

TABLE VII

Effects of Various Vapor Phase Treatments Upon Methylamine Selectivity of Zeolite H—Rho

| Example | Treatment Compound | Temp. (°C.) | Feed Flow (mL/hr) | MeOH Conv. (%) | MeOH—MA Conv. (%) | Selectivity % | | |
|---|---|---|---|---|---|---|---|---|
| | | | | | | MMA | DMA | TMA |
| 15 | HMDS | 300 | 6 | 88 | 85 | 19 | 63 | 19 |
| | None | 300 | 6 | 95 | 90 | 17 | 46 | 38 |
| 16 | DCDMS | 325 | 12 | 88 | 85 | 18 | 65 | 17 |

TABLE VII-continued

Effects of Various Vapor Phase Treatments Upon Methylamine Selectivity of Zeolite H—Rho

| Example | Treatment Compound | Reaction Temp. (°C.) | Feed Flow (mL/hr) | MeOH Conv. (%) | MeOH— MA Conv. (%) | Selectivity % MMA | DMA | TMA |
|---|---|---|---|---|---|---|---|---|
| 17 | SiCl$_4$ | 325 | 12 | 92 | 89 | 17 | 57 | 26 |
| 18 | CTMS | 325 | 12 | 91 | 86 | 18 | 61 | 21 |
| 19 | TMP | 325 | 12 | 88 | 85 | 17 | 72 | 11 |
|  | None | 325 | 12 | 92 | 89 | 12 | 41 | 47 |
|  | None (Doubly Calcined) | 325 | 12 | 94 | 91 | 16 | 42 | 42 |
| 20 | SiCl$_4$ | 300 | 1 | 96 | 92 | 18 | 75 | 8 |
|  | None | 300 | 4 | 87 | 83 | 19 | 48 | 33 |
| 21 | TMAl | 300 | 5 | 88 | 85 | 20 | 72 | 8 |
|  | None | 300 | 8 | 95 | 94 | 15 | 48 | 36 |

What is claimed is:

1. A process for producing dimethylamine, comprising reacting methanol and/or dimethylether and ammonia, in amounts sufficient to provide a carbon/nitrogen (C/N) ratio from about 0.2 to about 1.5, and at a temperature from about 250° C. to about 450° C., in the presence of a catalytic amount of a modified acidic zeolite selected from the group consisting of chabazite, erionite, ZK-5, and rho, the zeolite having been modified by treatment with one or more compounds containing at least one element selected from the group consisting of silicon, aluminum, phosphorus, and boron, to deposit thereon at least 0.05 weight percent of the element.

2. A process according to claim 1, conducted at a pressure from 7 to 7000 kPa and at a reactant feed rate sufficient to provide a methanol space time of from 0.01 to 80 hours.

3. A process according to claim 2, wherein the temperature is from 300° C. to 400° C.

4. A process according to claim 3, wherein the pressure is from 70 to 3000 kPa, and the methanol space time is from 0.10 to 1.5 hours.

5. A process according to claim 1, wherein the element is silicon.

6. A process according to claim 1, wherein the element is aluminum.

7. A process according to claim 1, wherein the element is boron.

8. A process according to claim 1, wherein the element is phosphorus.

9. A process according to claim 5, wherein the zeolite is H-chabazite.

10. A process according to claim 5, wherein the zeolite is H-erionite.

11. A process according to claim 5, wherein the zeolite is H-ZK-5.

12. A process according to claim 5, wherein the zeolite is H-rho.

13. A process according to claim 6, wherein the zeolite is H-chabazite.

14. A process according to claim 6, wherein the zeolite is H-erionite.

15. A process according to claim 6, wherein the zeolite is H-ZK-5.

16. A process according to claim 6, wherein the zeolite is H-rho.

17. A process according to claim 7, wherein the zeolite is H-rho.

18. A process according to claim 7, wherein the zeolite is H-ZK-5.

19. A process according to claim 7, wherein the zeolite is H-chabazite.

20. A process according to claim 7, wherein the zeolite is H-erionite.

21. A process according to claim 8, wherein the zeolite is H-rho.

22. A process according to claim 8, wherein the zeolite is H-ZK-5.

23. A process according to claim 8, wherein the zeolite is H-chabazite.

24. A process according to claim 8, wherein the zeolite is H-erionite.

25. A process according to claim 1, wherein the zeolite is treated by deposition of silicon, aluminum, boron, or phosphorus from a liquid phase.

26. A process according to claim 1, wherein the zeolite is treated by deposition of silicon, aluminum, boron, or phosphorus from a vapor phase.

* * * * *